United States Patent
Miles

(10) Patent No.: US 8,670,710 B2
(45) Date of Patent: Mar. 11, 2014

(54) FILTERING A SINGLE WIRE PROTOCOL (SWP) CURRENT SIGNAL TO BE PROVIDED TO A NEAR FIELD COMMUNICATIONS (NFC) DEVICE

(75) Inventor: David John Miles, Cirencester (GB)

(73) Assignee: Broadcom Innovision Limited, Cambridge, Cambridgeshire (GB)

( * ) Notice: Subject to any disclaimer, the term of this patent is extended or adjusted under 35 U.S.C. 154(b) by 145 days.

(21) Appl. No.: 13/260,742

(22) PCT Filed: Sep. 7, 2010

(86) PCT No.: PCT/GB2010/051491
§ 371 (c)(1), (2), (4) Date: Sep. 28, 2011

(87) PCT Pub. No.: WO2011/027179
PCT Pub. Date: Mar. 10, 2011

(65) Prior Publication Data
US 2012/0100804 A1 Apr. 26, 2012

(30) Foreign Application Priority Data
Sep. 7, 2009 (GB) .................................. 0915547.4

(51) Int. Cl.
*H04B 5/00* (2006.01)

(52) U.S. Cl.
USPC ... 455/41.1; 455/41.2; 455/550.1; 455/556.2; 455/557; 455/573; 455/80; 455/126; 340/10.1; 340/572.1; 340/854.6; 340/854.8; 320/106; 320/108; 235/492

(58) Field of Classification Search
USPC ............. 455/41.1, 41.2, 41.3, 107, 80, 550.1, 455/69, 126, 556.2, 557, 130, 573; 340/10.1, 572.1, 854.6, 854.8; 235/492
See application file for complete search history.

(56) References Cited

U.S. PATENT DOCUMENTS 6,054,892 A * 4/2000 Miles et al. .................... 327/512
7,881,665 B2 * 2/2011 Symons ........................ 455/41.1
(Continued)

FOREIGN PATENT DOCUMENTS

WO WO 2008/117029 2/2008
WO WO 2009/093075 A2 7/2009

OTHER PUBLICATIONS

International Preliminary Report on Patentability and Written Opinion for International Application No. PCT/GB2010/051491, The International Bureau of WIPO, Geneva, Switzerland, issued Mar. 13, 2012; 9 pages.

(Continued)

*Primary Examiner* — Marceau Milord
(74) *Attorney, Agent, or Firm* — Sterne, Kessler, Goldstein & Fox, P.L.L.C.

(57) ABSTRACT

A communications device is disclosed that includes a united integrated circuit card (UICC) that provides a single wire protocol (SWP) current signal to a near field communications (NFC) device. The SWP current signal is filtered by a filter to remove noise from the SWP current signal. The filter is precharged by a reference voltage when the SWP current signal is in a low state and then filters the SWP current signal when the SWP current signal is in a high state. A switching network provides the filter with the reference voltage to precharge when the SWP is current signal is in the low state and then provides the filter with the SWP current signal to filter when the SWP current signal is in the high state.

20 Claims, 6 Drawing Sheets

(56) References Cited

U.S. PATENT DOCUMENTS

| | | | |
|---|---|---|---|
| 7,986,916 B2* | 7/2011 | Williams | 455/41.1 |
| 8,078,225 B2* | 12/2011 | Kargl et al. | 455/558 |
| 8,140,010 B2* | 3/2012 | Symons et al. | 455/41.1 |
| 8,150,321 B2* | 4/2012 | Winter et al. | 455/41.2 |
| 8,233,842 B2* | 7/2012 | Symons | 455/41.1 |
| 8,249,500 B2* | 8/2012 | Wilson | 455/41.1 |
| 8,260,199 B2* | 9/2012 | Kowalski | 455/41.1 |
| 8,272,573 B2* | 9/2012 | Hartel | 235/492 |
| 8,282,009 B2* | 10/2012 | Ahn et al. | 235/492 |
| 8,326,224 B2* | 12/2012 | Butler | 455/41.1 |
| 8,422,946 B2* | 4/2013 | Bangs et al. | 455/41.1 |
| 8,432,293 B2* | 4/2013 | Symons | 340/854.8 |
| 2005/0224589 A1* | 10/2005 | Park et al. | 235/492 |
| 2005/0252978 A1* | 11/2005 | Nishizawa et al. | 235/492 |

OTHER PUBLICATIONS

International Standard: ISO/IEC 21481, *Information technology—Telecommunications and information exchange between systems—Near Field Communication Interface and Protocol—2(NFCIP-2)*, pp. 1-12, First edition, Reference No. ISO/IEC 21481:2005(E), ISO/IEC (Jan. 2005).

International Standard: ISO/IEC 18092, *Information technology—Telecommunications and information exchange between systems—Near Field Communication—Interface and Protocol (NFCIP-1)*, pp. 1-66, First edition, Reference No. ISO/IEC 18092:2004(E), ISO/IEC (Apr. 2004).

International Standard: ISO/IEC 14443, *Identification cards—Contactless integrated circuit cards—Proximity cards, Part 4: Transmission protocol*, pp. 1-46, Second edition, Reference No. ISO/IEC 14443-4:2008(E), ISO/IEC (Jul. 2008).

International Standard: ISO/IEC 15693, *Identification cards—Contactless integrated circuit cards—Vicinity cards—Part 3: Anticollision and Transmission protocol*, pp. 1-51, First edition, Reference No. ISO/I EC 15693-3:2001 (E), ISO/IEC (Apr. 2001).

European Telecommunications Standard Institute: ETSI TS 102613, *Smart Cards; UICC—Contactless Front-end (CLF) Interface; Part 1: Physical and Data Link Layer Characteristics*, pp. 1-58, Seventh Edition, Reference No. ETSI TS 102613 v.7.6.0, ETSI TS (2009-2010).

\* cited by examiner

FILTERING A SINGLE WIRE PROTOCOL (SWP) CURRENT SIGNAL TO BE PROVIDED TO A NEAR FIELD COMMUNICATIONS (NFC) DEVICE

CROSS-REFERENCE TO RELATED APPLICATIONS

This application is a National Stage of International Application No. PCT/GB2010/051491, filed on Sep. 7, 2010, which claims the benefit of Great Britain Patent Application No. 0915547.4, filed on Sep. 7, 2009.

This invention relates to single wire protocol (SWP) signalling and more particularly to noise rejection techniques for SWP in electronic mobile telecommunications apparatus. Still more particularly this invention relates to communication between a near field radio frequency communicator and a Universal Integrated Circuit Card (UICC) module in a telecommunications device via a single wire protocol.

Aspects and preferred features of the invention are set out in the claims.

In an aspect there is provided a near field RF communicator including a near field RF communicator including a coupling interface for communication using a single wire protocol, SWP, wherein an SWP employs a voltage signal (S1) to transmit signals and a current signal (S2) to receive signals at the interface, and the near field RF communicator further comprising a controller for controlling a switch, the controller operable, in response to a control signal, to provide a delay and then to control the switch to couple an SWP current signal to the interface. This and other examples of the invention have the advantage of providing effective noise rejection on the SWP line between a UICC and a near field RF communicator.

In an aspect there is provided a coupling interface for communication using a single wire protocol SWP, wherein an SWP employs a voltage signal (S1) to transmit signals from the interface and a current signal (S2) to receive signals at the interface, the coupling interface including a controller for controlling a switch, the controller operable, in response to a control signal, to provide a delay and then to control the switch to couple an SWP current signal to the interface.

Described herein is a near field RF communicator including a coupling interface for communication using a single wire protocol and a controller for controlling a switch configuration, the controller operable to provide a delay and then to control the switch to couple a signal to the interface. The controller can be operable to control a switching configuration in response to a control signal.

In an embodiment the interface includes at least one capacitor wherein the controller is operable to control the switch configuration to couple the capacitor to a reference voltage.

In an embodiment the controller is operable to control the switch configuration such that the capacitor is coupled to the reference voltage during the delay period and coupled to provide a filter during a second period.

Preferably the delay is selected according to at least one characteristic of an SWP current signal, still more preferably the delay corresponds to the length of a transient signal current in an SWP signal. Optionally a preferred delay is provided by the use of a selected timing capacitance.

In an embodiment the controller includes a timing capacitor to provide a delay which corresponds to at least one characteristic of an SWP current signal. Preferably the delay corresponds to the length of a transient current in an SWP signal, in some embodiments the length of this delay is selected according to one or more inherent capacitances of the SWP interface, for example according to a time constant of the SWP interface.

In some embodiments the switch configuration comprises two switching elements. The interface may be external to the near field RF communicator while in other embodiments the interface is within the near field RF communicator.

Also described herein is a coupling interface for communication using a single wire protocol including a controller for controlling a switch, the controller operable, in response to a control signal, to provide a delay and then to control the switch to couple an SWP current signal to the interface. Said coupling interface may be provided with any of the optional or preferred features set out herein for example such as the features described in any of claims 2 to 8.

An embodiment of the invention provides a near field RF communicator including an SWP coupling interface. Preferably such an SWP coupling interface corresponds to the coupling interface described in the foregoing paragraph or may be substantially as described herein with reference to the accompanying drawings. Preferably a near field RF communicator is an NFC communicator.

Embodiments of the invention provide computing and mobile telecommunication devices including a near field RF communicator as set out in the preceding paragraph.

In an aspect there is provided a single wire protocol interface, operable according to a single wire protocol, SWP, wherein an SWP employs a voltage signal (S1) to transmit signals from the interface and a current signal (S2) to receive signals at the interface, wherein the current detection circuitry is disconnected from the single line during switching transients following the line being driven high.

An example of the invention provides a near field RF communicator and/or an NFC communicator including an SWP coupling interface substantially as described herein with reference to FIGS. 4 and 5.

Preferred embodiments of the invention will now be described in greater detail, by way of example only, with reference to the accompanying drawings, in which.

DESCRIPTION

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The near field RF communicator may be provided wholly or partially as an integrated circuit or collection(s) of integrated circuits.

Figure 1:
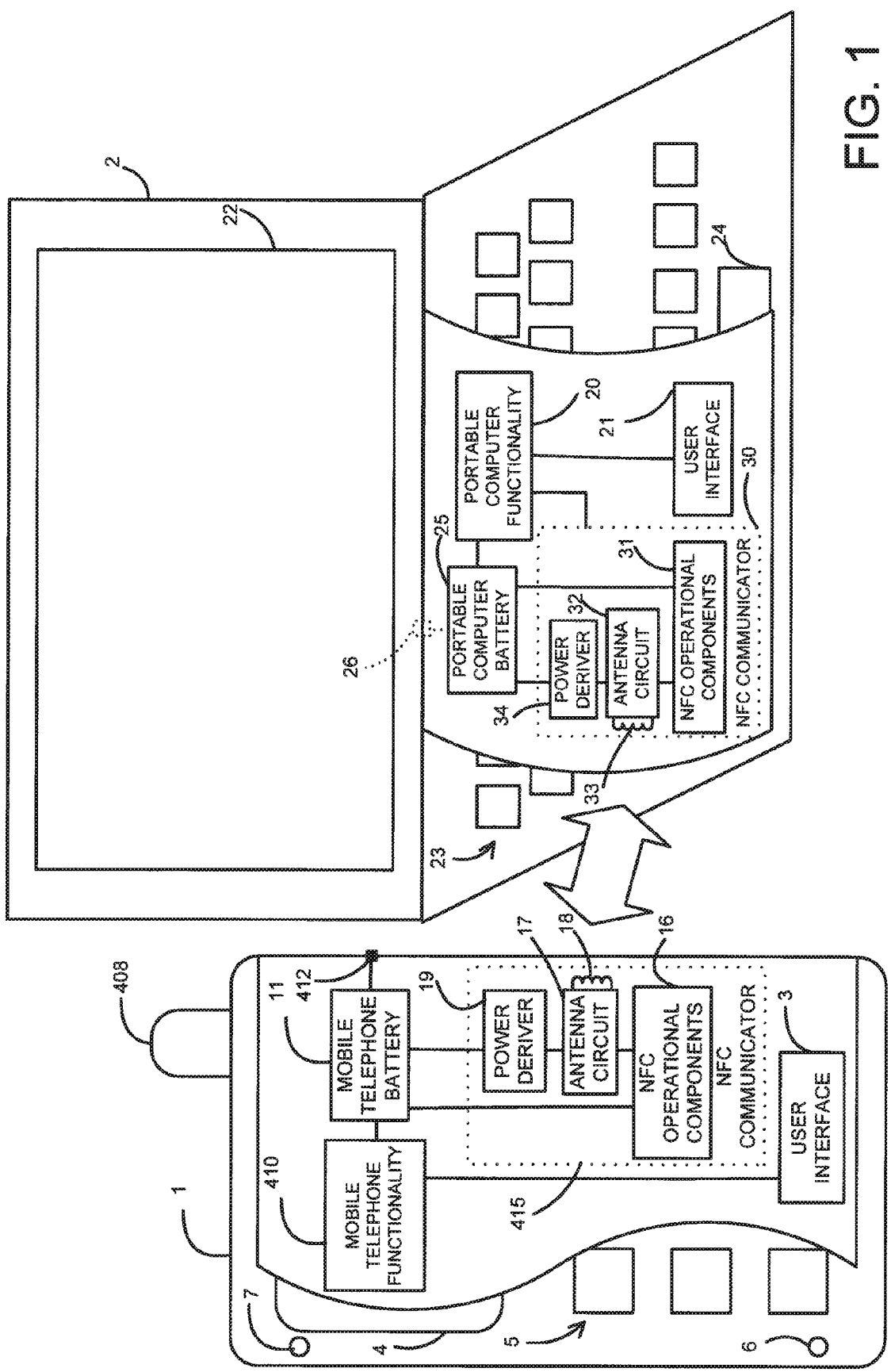
FIG. 1 shows a representational diagram illustrating communication between two devices comprising NFC communicators.

Referring now specifically to FIG. 1, there is shown a representational diagram illustrating communication between two NFC communications enabled devices. In FIG. 1 the representations of the NFC communications enabled devices have been shown partly cut-away and the functionality provided by the NFC communications enabled devices illustrated by way of a functional block diagram within the NFC communications enabled device.

As shown in FIG. 1, one NFC communications enabled device comprises a mobile telephone (cellphone) 1 and the other NFC communications enabled device comprises a portable computer 2 such as a notebook or laptop computer.

The mobile telephone 1 has the usual features of a mobile telephone including mobile telephone functionality 410 (in the form of, usually, a programmed controller, generally a processor or microprocessor with associated memory or data storage, for controlling operation of the mobile telephone in combination with a SIM card), an antenna 408 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 412 via which a mains adapter (not shown) may be connected to enable charging of the battery 11. The mobile telephone 1 may have an alternative or additional power supply (not shown), for example a reserve battery or emergency battery. The chargeable battery 11 forms the primary power supply for the mobile telephone and NFC communicator 15. Given it is chargeable, it is designed to be removed at certain times.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25. Again the chargeable battery 25 is the primary power supply for the portable computer and NFC communicator 30.

In addition, as shown in FIG. 1, both NFC communications enabled devices 1 and 2 have an NFC communicator 415 and 30. As shown, the NFC communicators 415 and 30 are incorporated within the larger devices and, as with the other functional blocks, may be discrete entities within the host devices or may be provided by features dispersed throughout or integrated within the host device or a part of the host device. Each NFC communicator 415 and 30 comprises NFC operational components 16 and 31 for, as will be described below, enabling control of the NFC functionality and generation, modulation and demodulation of an RF signal. Each NFC communicator 415 and 30 also comprises an antenna circuit 17 and 32 comprising an inductor or coil in the form of an antenna 18 and 33. The antenna circuits 17 and 32 enable an alternating magnetic field (H field) generated by the antenna of one near field RF communicator 415 (or 30) by transmission of an RF signal (for example a 13.56 Mega Hertz signal) to be inductively coupled to the antenna of the other near field RF communicator 30 (or 15) when that antenna is within the near field of the RF signal generated by the one near field RF communicator 415 (or 30).

The NFC communicators 415 and 30 are coupled to the mobile telephone and portable computer functionality 410 and 20, respectively, to enable data and/or control commands to be sent between the NFC communicator and the host device and to enable user input to the NFC communicator. Communication between the user interface 3 or 21 and the NFC communicator 415 or 30 is via the host device functionality 11 or 20, respectively.

Each NFC communicator 415 and 30 also comprises a power provider 19 and 34. The power providers 19 and 34 may be power supplies within the host device or specific to the NFC communicators 415 and 30, for example a button cell battery, or other small battery. In this case as shown by dashed lines in FIG. 1, one or both of the power providers 19 and 34 comprise a coupling to derive power from the corresponding device battery 11 or 25 i.e. the primary power supply.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device. As another possibility the NFC communicator (15 or 3) may be comprised within or coupled to a peripheral device, for example in the form of a smart card or other secure element which may be stand alone or comprised within or intended to be inserted into another electrical device. For example a SIM card for use in a mobile telephone. As a further possibility such peripheral devices may comprise interfacing systems or protocols such as the single wire protocol.

Also, rather than being incorporated within the host device, the NFC communicator 415 or 30 may be associated with the host device, for example by a wired or wireless coupling. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications enabled device or another device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
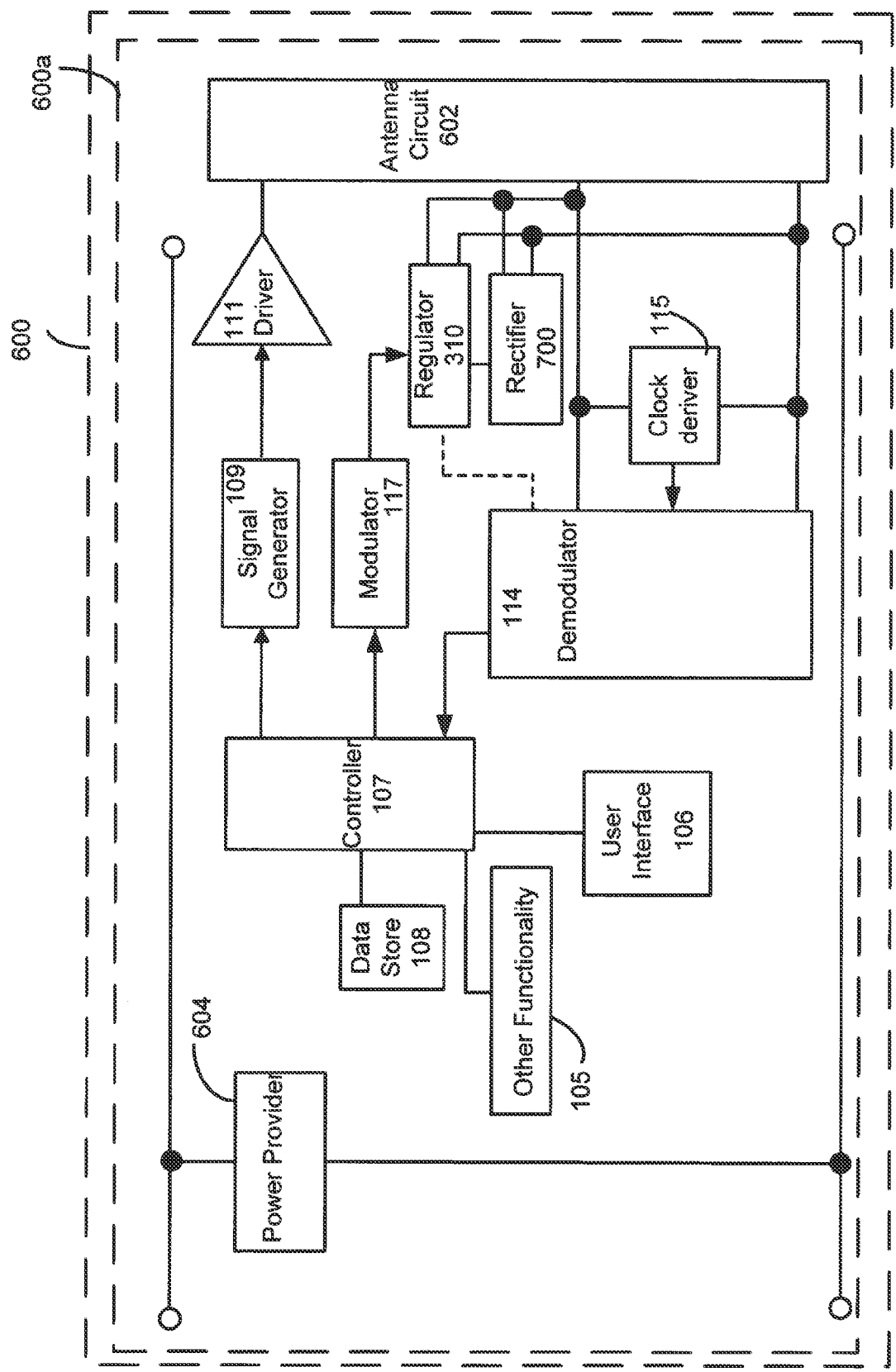
FIG. 2 shows a very schematic view of components of an NFC communicator.

FIG. 2 shows a functional block diagram of an NFC communications enabled device 600 in accordance with the invention to illustrate in greater detail one way in which the NFC operational components of an NFC communications enabled device embodying the invention may be implemented.

In this example, the NFC communications enabled device 600 comprises an NFC communicator 600a having NFC operational components including an antenna circuit 102, power provider 104, controller 107, data store 108, signal generator 109 modulator 117 and demodulator 114.

The power provider 604 may be any one or more of the types of power providers discussed above. In the interests of simplicity, power supply couplings from the power provider 604 to other components are not shown in FIG. 2.

The NFC communications enabled device 600 may or may not also have or be capable of being connected or coupled with at least one of other functionality 105 (for example functionality of a host device or peripheral device such as described above) and a user interface 106.

The NFC operational components include a demodulator 114 coupled between the antenna circuit 602 and the controller 107 for demodulating a modulated RF signal inductively coupled to the antenna circuit 602 from another near field RF communicator in near field range and for supplying the thus extracted data to the controller 107 for processing. Rectifier 700 is coupled to provide a rectified output to regulator 310. Rectifier 700 and regulator 310 are coupled to the outputs AC1 and AC2 of the antenna circuit. The regulator 310 sets or regulates a voltage supply level (pin voltage) and the rectifier 700 provides rectified voltage to remainder of NFC circuit. The regulator 310 sets or regulates the voltage between the outputs AC1 and AC2 of the antenna circuit based on the voltage supply level (pin voltage) provided by the rectifier 200. As shown the demodulator 114 is coupled to the antenna circuit outputs AC1 and AC2. As another possibility, as shown in dashed line in FIG. 2, the demodulator may receive its input from the regulator 310. As a further possibility, the demodulator 114 may receive its input from the rectifier 200. In one possibility the regulator 310 regulates the voltage between the outputs AC1 and AC2 of the antenna circuit based on that voltage rather than the rectified voltage.

The NFC operational components include a modulator 117 coupled to the controller 107 and to the regulator 310 so that a modulation signal may be applied to the regulator 31 to cause the regulator to vary the load on the antenna circuit 102.

A clock deriver 115 is coupled to receive the voltage AC1-AC2 of the antenna circuit and to derive a clock signal from the voltage AC1-AC2 and is coupled to provide the derived clock signal to the demodulator 114 and can be coupled to provide the derived clock signal to any of the controller 107, the signal generator 109, the modulator 117 and/or other functionality 105 of the near field RF communicator. Any appropriate clock derivation may be used such as, for example, a clock recovery.

Together the rectifier 700 and regulator 310 protect the NFC operational components from high voltages received at antenna circuit 102. For example the regulator may limit the voltage to 3.3 or 1.8 volts dependent on the voltage tolerance of the NFC operational components. Any suitable regulator and rectification circuit can be used for this. The NFC operational components may also include an amplifier for amplifying an RF signal inductively coupled to the antenna circuit 102.

In addition the NFC operational components include components for enabling modulation of an RF signal to enable data to be communicated to another near field RF communicator in near field range of the NFC communicator 100a. The data to be communicated is provided from controller 107 to modulator 117 and as shown in FIG. 2, modulator 117 is arranged to control regulator 310 to modulate the effective impedance of the antenna circuit 602 in order to load modulate an RF H-field inductively coupled to the antenna circuit 102. Drive elements are also provided for providing a modulated RF signal to the antenna these components comprise a signal generator 109 coupled via a driver 111 to the antenna circuit 102. In this example, the signal generator 110 causes modulation by gating or switching on and off the RF signal in accordance with the data to be communicated. The NFC communicator may use any appropriate modulation scheme that is in accordance with the standards and/or protocols under which the NFC communicator operates. As another possibility a separate or further signal controller may be incorporated within the NFC operational components to control modulation of the signal generated by the signal generator 109 in accordance with data or instructions received from the controller 107.

The NFC operational components also include a controller 107 for controlling overall operation of the NFC communicator. The controller 107 is coupled to a data store 108 for storing data (information and/or control data) to be transmitted from and/or data received by the NFC communications enabled device. The controller 107 may be a controller of a host device and/or a microprocessor, for example a RISC processor or other microprocessor or a state machine. Program instructions for programming the controller and/or control data for communication to another near field RF communicator may be stored in an internal memory of the controller and/or the data store.

The NFC communicator 600a may operate in an initiator mode (that is as an initiating near field RF communicator) or a target mode (that is as a responding near field RF communicator), dependent on the mode to which the NFC communicator is set. The mode may be determined by the controller 107 or may be determined in dependence on the nature of a received near field RF signal. When in initiator mode, an NFC communicator initiates communications with any compatible responding near field RF communicator capable of responding to the initiating NFC communicator (for example an NFC communicator in target mode or an RFID tag or transponder) that is in its near field range, while when in target mode an NFC communicator waits for a communication from a compatible initiating near field RF communicator (for example an NFC communicator in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693. NFC communicators commonly operate at or around 13.56 MHz.

When in initiator or target mode, the NFC communicator may communicate in accordance with an active or passive protocol. When using an active protocol the initiating NFC communicator will transmit an RF field and following completion of its data communication turn off its RF field. The responding near field RF communicator (target) will then transmit its own RF field and data before again turning off the RF field and so on. When using a passive protocol the NFC communicator (initiator) will transmit and maintain its RF field throughout the entire communication sequence. The protocol used will depend on instructions received from the controller 107 and the response received from a responding near field RF communicator.

In FIG. 2 control of operation of the NFC communicator is through controller 107. As another possibility where the NFC communicator is comprised as part of a host device, control of the operation of the NFC communicator may be directed by the host device, for example through other functionality 105. In such circumstances all or part of the control may be provided by other functionality 105. For example the NFC communicator controller 107 may control modulation and modulation protocols whereas the data to be transmitted may be directed by the host device through other functionality 105 or through controller 107. In these circumstances the voltage levels of the modulation signal are set by the host device.

The NFC communicator also comprises an antenna circuit 102. The design of the antenna circuit will depend on the NFC communicator 600 and the environment in which it operates. For example the antenna circuit may be in the form described for co-pending international patent application number PCT/GB2008/000992 (which claims priority from GB 0705635.1).

Figure 3:
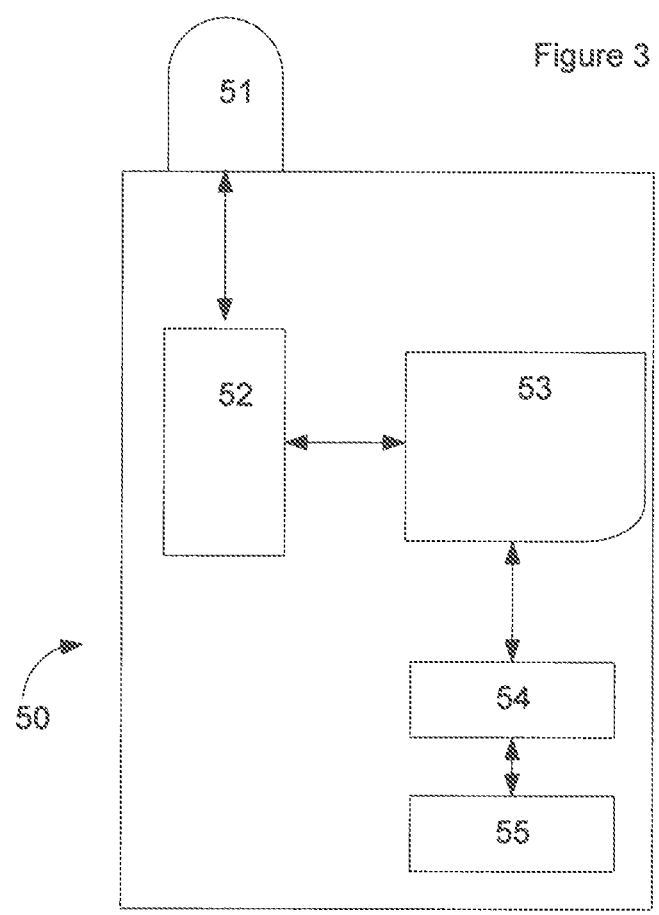
FIG. 3 shows a very schematic representation of a mobile telecommunications device.

FIG. 3 shows a mobile telecommunications device 50 having a long range RF antenna 51 and a telecoms modem 52 to support mobile telecommunications, for example GSM, GPRS, UMTS, or HSDPA communication using a cellular telephone network. The mobile telecommunications device 50 includes a UICC 53 which typically includes one or more secure elements for supporting transaction or billing functions associated with the device and/or a user of the device. Mobile telecommunications devices according to some examples of the invention include a near field RF communicator 54 and a short range RF antenna 55 arranged to couple inductively with the H-field of another short range RF antenna in near field range. This near field RF communicator is coupled to communicate with the UICC by means of an SWP communication interface. As will be appreciated, SWP provides bidirectional communication along a single wire using current and voltage signalling. SWP signals in one direction are provided by variations in the mark space ratio of a voltage whilst in the other direction signalling is by means of a current variation.

The SWP interface employs a voltage signal, denoted S1 and a current signal, denoted S2. S1 is a voltage signal provided by the master to the slave. S2 is a current signal provided by the slave to the master. The signal S2 is only measured when the signal S1 is high. In the present example the master is a near field RF communicator, such as an NFC communicator, which may be referred to as a contactless front end (CLF); and the slave is the UICC.

A logical 'one' of the S1 signal is provided by a 0.75 duty cycle waveform i.e. S1 is high for 0.75 of the waveform period. A logical 'zero' of the S1 signal is provided by a 0.25 duty cycle waveform, i.e. S1 is high for 0.25 of the waveform period.

The S2 signal is only valid when S1 is high. A logical 'one' of the S2 signal is indicated by the slave (in this case the UICC) drawing a current of between 600 µA and 1000 µA. A logical 'zero' of the S2 signal is indicated by the slave (in this case the UICC) drawing a current of between 0 and 20 µA.

SWP signalling can be characterised by the bit duration, the duration of a cycle in the S1 signal. Rapid SWP signalling can employ bit durations of 0.59 µs. As set out above signalling on the S1 line is provided by 0.25 and 0.75 duty cycle square waves, to support signalling at this rate it is therefore necessary to resolve signalling changes which occur over 0.25 of a 0.59 µs cycle. To meet the Nyquist criterion in this case requires a sampling bandwidth of 13.56 MHz.

SWP is designed for signalling along a single wire. The single wire coupling between a CLF (near field RF communicator) and the UICC has some inherent inductance, therefore electromagnetic interference (EMI) can couple inductively with this wire. In an environment with high levels of EMI such as within a mobile telecommunications device, due to its length and the absence of any shielding, the single communication line between an NFC component and a UICC communicating via a single wire protocol will couple with relatively high amplitude, broad band, noise signals. These noise signals can substantially degrade communication on the line, for example providing a signal to noise ratio (SNR) of 10% or less.

One way to improve the SNR might be to use a low pass filter. However in order to provide adequate SNR improvement the time constant of the filter would need to be relatively long.

Figure 4:
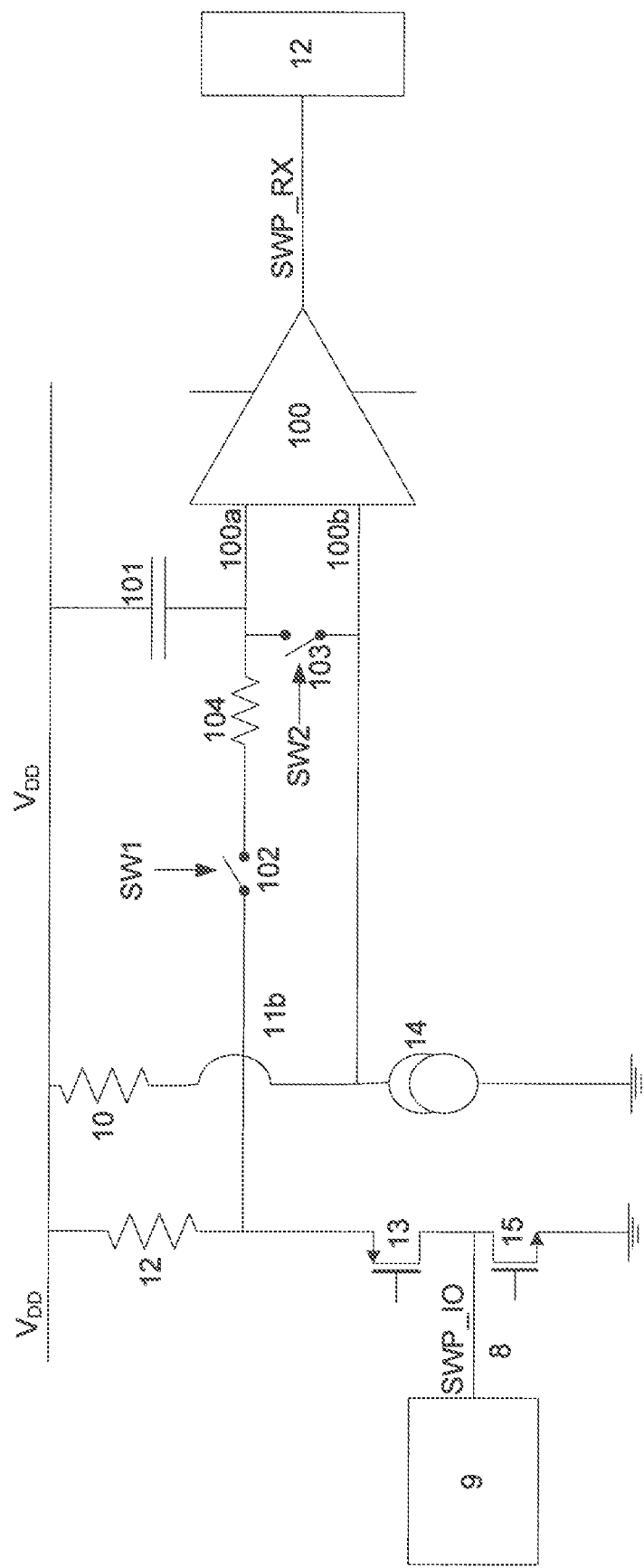
FIG. 4 shows a diagram of a circuit according to an example of the invention.

Referring to the diagram of FIG. 4, comparator 100 has two inputs 100a and 100b and an output which provides an output signal SWP_RX to near field RF communicator 12. Comparator input 100a is coupled to one plate of filter capacitor 101, the other plate of filter capacitor 101 is coupled to a supply or reference voltage $V_{DD}$. A switch 103 is coupled between comparator inputs 100a and 100b to provide a switchable conducting path between the comparator inputs controlled by control signal SW2.

UICC card 9 is coupled to provide signal SWP_IO to the drain of NMOS transistor 15 and to the drain of PMOS transistor 13. The source of NMOS transistor 15 is coupled to a ground or reference voltage. The source of PMOS transistor 13 is coupled to a supply or reference voltage $V_{DD}$ by sense resistance 12 and is coupled by switch 102, in series with resistance 104, to comparator input 100a. A control signal SW1 is arranged to control switch 102.

Resistance 10 is coupled between the supply or reference voltage $V_{DD}$ and the comparator input 100b. Current sink/source 14 is connected between comparator input 11a and a ground or reference voltage.

Current sink/source 14 determines a current through resistance 10 to provide a reference voltage at comparator input 100b.

When SWP_IO is high, a current variation signal SWP_IO provided by UICC 9 develops a voltage across the sense resistance 12. Comparator 100 provides an output signal SWP_RX which depends upon the difference between the voltages at comparator inputs 100a and 100b.

The gate connections of transistors 13 and 15 provide voltage control of the SWP_IO line. Dependent on the gate voltages applied to transistors 13 and 15, the SWP_IO line may be coupled to a ground or reference voltage (low) or to the supply voltage $V_{DD}$ by resistor 12 (high). When the SWP_IO voltage is high (transistor 13 is conducting) the UICC may draw a current to provide signalling from the UICC to the CLF. However, the physical input/output wire 8 of the UICC 9 has an inherent capacitance. This results in a transient current surge when the SWP_IO voltage changes. This current surge can cause a transient filter response which, in the presence of a low pass filter with a long time constant, is likely to mask any current signalling provided on the line. In other words the filter capacitor 101 will tend to smooth-out the initial current surge and cause it to persist too long for the filter to be useful with low current signals which change on sub-microsecond timescales.

Digital signal processing techniques provide one solution to this problem. However such techniques require a suitably high frequency clock signal. In NFC applications, typically it is required that the NFC must be able to operate and communicate with a UICC while in a "battery-off" mode. In "battery-off" mode the NFC host (for example the mobile phone 50 of FIG. 3) has no battery power available and therefore an external clock signal may not be available.

In the example of FIG. 4 control signal SW2 is arranged to control switch 103 to switch on and off a conducting path between comparator inputs 100a and 100b. When SW2 controls switch 103 to be closed (and SW1 controls switch 102 to be open), the voltage difference between 100b and the supply or reference voltage level $V_{DD}$ is applied to capacitor 101 which accumulates charge dependent on this voltage difference, its capacitance and the length of time for which the switches are held in this configuration.

When switch 102 is closed and switch 103 is open the voltage at 100b depends on the voltage across resistor 12 and on the charge on filter capacitor 101.

When capacitor 101 is appropriately charged the voltage at comparator input 100a can be controlled by a current drawn by SWP_IO.

In this example switches 102 and 103 are provided by appropriately biased field effect transistors but may be provided by any suitable voltage controlled impedance. Optionally current sink/source 14 is provided by mirroring a reference current from a band gap reference. Optionally the gate voltages of transistors 13 and 15 are controlled using a tri-state driver.

Figure 5:
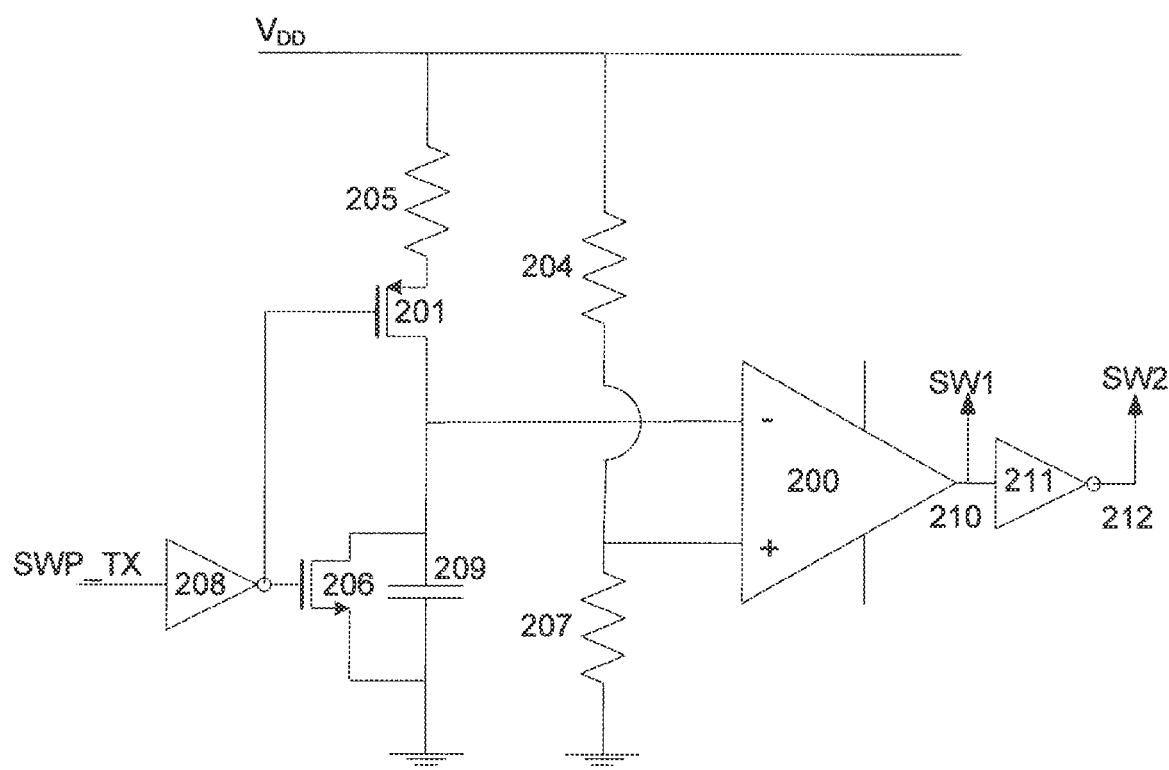
FIG. 5 shows a control circuit to provide switch control signals for use in the circuit of FIG. 4; and, FIG. 6 illustrates the timing of certain signals which exist in an example of the invention in use.

One example of a control circuit to provide switch control signals SW1 and SW2 for a circuit according to FIG. 4 is shown in FIG. 5. An input control signal SWP_TX is derived from a controlling logic, for example from controlling logic of the host device and is coupled to the input of an inverter 208. The output of inverter 208 is coupled to the gate of PMOS transistor 201 and NMOS transistor 206. The source and drain of NMOS transistor 206 are coupled across timing capacitor 209. The source of NMOS transistor 206 is coupled to the drain connection of PMOS transistor 201. Resistance 205 provides a conduction path between supply or reference voltage $V_{DD}$ and the source connection of PMOS transistor 201. The drain of PMOS transistor 201 is coupled to comparator input 200a.

Resistances 207 and 204 provide a potential divider which couples supply or reference voltage $V_{DD}$ to a ground voltage. The coupling between resistance 204 and resistance 207, the mid-point of this potential divider, is coupled to comparator input 200b.

Comparator output 210 is coupled to the input of inverter 211 and to provide output signal SW1. The output 212 of inverter 211 is coupled to provide output signal SW2.

In this example, the output signal SW1 of FIG. 5 is coupled to control switch 102 (shown in FIG. 4) and the output signal SW2 of FIG. 5 is coupled to control switch 103 (shown in FIG. 4).

When the SWP_TX voltage is high, the output voltage of inverter 208 goes low, PMOS transistor 201 is biased into a conducting state and NMOS transistor 206 is not biased into a conducting state. This causes timing capacitor 209 to charge with the current drawn from $V_{DD}$ through resistance 205.

The comparator input 200a is coupled to the timing capacitor 209 and comparator input 200b is coupled to the midpoint of the potential divider 204, 207. Therefore, whenever the voltage across the timing capacitor 209 exceeds or drops below a level determined 20 by the potential divider 204, 207, the comparator output 210 will change polarity and therefore provide a change in the timing signals SW1 and SW2. When signal SWP_TX is low, the output of inverter 208 is high and NMOS transistor 206 is biased into a conducting state which causes timing capacitor 209 to discharge through NMOS transistor 206. This provides a reset of the timing capacitor 209. Thus the circuit of FIG. 5 controls the timing of the switch control signals SW1 and SW2.

Figure 6:
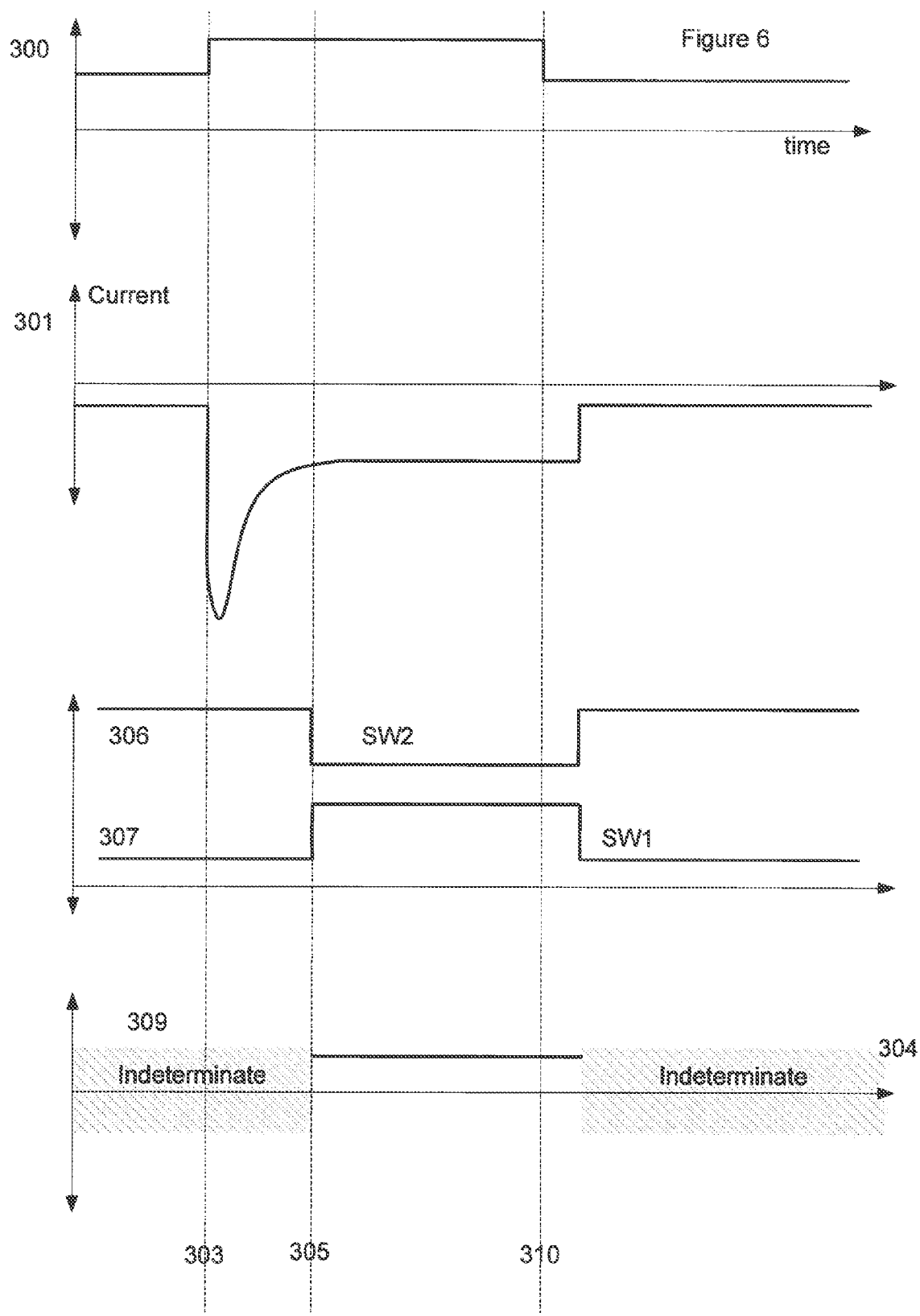

In this example there is no particular relationship between the chosen capacitance of timing capacitor 209 and the capacitance of the input/output line 8 of the UICC 9. However the resistance 205 and transistor 201 of FIG. 6 are chosen to correspond to the sense resistance 12 and the PMOS transistor 13. For example the transistors 201 and 13 may be matched and resistance 205 may be chosen to have a resistance in proportion to sense resistance 12 so that the current in resistance 205 is proportional to the current in sense resistance 12.

Generating the switch control signals SW1 and SW2 in the manner described enables the filter capacitor 101 to be pre-charged for a selected period while a current surge is diverted through resistor 12 prior to current mode communication over the SWP. As will be apparent to the skilled practitioner having read the present application, by an appropriate choice of components the duration of this period can be selected to match the duration of the current surge on SWP_IO. In some examples matching is provided by selecting this duration to be: not less than; substantially equal to; or equal to within a determined tolerance, for example 20%, 10%, 5%, 1% or less than 1% of the duration of the current surge on SWP_IO. Advantageously this allows the pre-charge time to be reduced to a minimum to ensure the initial surge current has ended whilst allowing the maximum time for the filter capacitor to settle. Advantageously allowing filter capacitor 101 to be charged prior to UICC to NFC communication reduces problematic filter transients while enabling noise rejection on the SWP line between a UICC and a near field RF communicator. Still more advantageously this noise rejection is achieved without the need for an external clock signal and by making use of a minimum number of electronic components.

FIG. 6 shows the operation and the timing of signals in the circuits of FIGS. 2 and 3 in the event that the S2 signal (current mode signalling from the UICC to the CLF) signals a logical '1' by drawing a current. In FIG. 6:

plot 300 shows a voltage against time graph of the signal SWP_TX, a control signal (for example applied by the controlling logic) which is applied to an input of the control circuit of FIG. 6;

plot 301 shows a graph of current against time for the current in the sense resistance 12 of FIG. 4, the transient current surge which results from the capacitance of the UICC input/output line 8 can be clearly seen;

plots 306 and 307 provide an indication of the control signal voltages SW1 and SW2.

plot 309 shows a voltage against time plot of the voltage applied to the comparator input 100a as a result of an SWP_IO signal and dashed line 304 indicates the reference signal SREF applied to the other comparator input 100b; and dashed lines 303, 305 and 310 indicate the timing of the rising edge of the SWP_TX signal, the end of the pre-charge period, and the falling edge of the SWP_TX signal respectively.

Referring now to the timings of FIG. 6 and to the circuit diagrams of FIGS. 2 and 3, at time 303 SWP_IO is conductively coupled to resistance 12 by transistor 13 (FIG. 4). At this time 303, as shown in FIG. 6, switch 102 is open so any charge held on the line 8 will discharge through resistance 12 (FIG. 4). At time 305, the circuit of FIG. 5 applies switch signals SW1 and SW2 to switches 102 and 103 to open switch 102 and close switch 103 (FIG. 4). Therefore, prior to time 305 any current surge associated with the discharge of the SWP_IO line will not be applied to filter capacitor 101 and after time 305 current drawn by the signal S2 will affect the voltage at comparator input 101b unmodified by any transient that would otherwise have arisen from the current surge. The output of comparator 100, SWP_RX, will therefore mirror the S1 signal. Clearly, when the comparator inputs are coupled together by switch 103 the comparator output will be indeterminate. All that is required is that SWP_RX be valid on the falling edge 310 of SWP_TX and for a short time thereafter.

Voltages and currents on the plots shown in FIG. 6 have been shown on axes indicating either positive or negative currents and/or changes in these currents or voltages of one particular polarity. As will be appreciated no particular voltage level is required (i.e. positive or negative voltage levels) and changes of one polarity could equivalently be represented as changes of an opposite polarity. As will be appreciated, as an alternative to the signal SWP_TX the voltage signal S2 may be used to gate the control circuit of FIG. 5.

Throughout the description reference has been made to PMOS and NMOS transistors. As will be appreciated in the context of the present application, by making appropriate modifications other transistors or voltage controlled impedances may be used instead.

In particular the drawing of FIG. 5 shows a circuit configured to control PMOS transistors as the switches SW1 and SW2 of FIG. 4. As will be appreciated by the skilled practitioner in the context of the present application, by making appropriate modifications to the circuit of FIG. 5 alternative switching devices could be used for SW1 and SW2. The diagram of FIG. 4 shows a circuit in which a filter capacitor is coupled between connection 100a and supply or reference voltage $V_{DD}$, in one possibility a capacitor is also coupled between connection 100b and supply or reference voltage $V_{DD}$ to provide a balanced filter.

Although a capacitor has been described as a separate component as will be appreciated any suitable capacitance may be employed, for example inherent or parasitic capacitances.

The present invention has been described with particular reference to mobile telecommunications devices such as mobile telephones. As will be appreciated by the skilled practitioner the techniques methods and apparatus described herein can be applied equivalently in other devices which employ SWP communication and will provide particular advantages where there is a need to perform SWP communication over an unshielded wire and at high data transfer rates (short bit duration).

As used herein the term single wire protocol relates to any communications protocol which operates bidirectional communication along a single wire and relates, in a particular example to an ETSI single wire protocol such as the protocol described in ETSI TS 102613 v7.6.0. "Smart Cards; UICC—Contactless Front-end (CLF) Interface; Part 1: 20 Physical and data link layer characteristics" (June 2008).

A near field communicator is described having a coupling interface for communication using a single wire protocol, the interface having a controller for controlling a switch, the controller operable, in response to a control signal, to provide a delay and then to control the switch to couple an SWP current signal to the interface. The interface itself is also described as are NFC communicators. The interface may include a capacitor which can be controllably coupled by means of a switch to charge the capacitor from a reference voltage before the capacitor is employed as a filter.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

The invention claimed is:

1. A communications device, comprising:
   a universal integrated circuit card (UICC) configured to provide a single wire protocol (SWP) current signal at a first level or at a second level;
   a filter configured to filter noise from the SWP current signal when the SWP current signal is at the second level;
   a near field communications (NFC) device configured to receive the SWP current signal from the UICC, wherein the SWP current signal received is a filtered SWP current signal when at the second level;
   a first switch configured to provide the SWP current signal at the second level to the filter when the first switch is in a conductive state; and
   a second switch configured to precharge the filter when the SWP current signal is at the first level and the second switch is in a conductive state.

2. The communications device of claim 1, further comprising:
   a reference voltage module configured to provide a reference voltage to the filter when the second switch is in the conductive state and the first switch is in a nonconductive state.

3. The communications device of claim 2, wherein the filter is further configured to be precharged with the reference voltage when the second switch is in the conductive state and the first switch is in the nonconductive state.

4. The communications device of claim 1, wherein the first switch is further configured to be in the conductive state when the SWP current signal is at the second level and in a nonconductive state when the SWP current signal is at the first level.

5. The communications device of claim 1, wherein the second switch is further configured to be in the conductive state when the SWP current signal is at the first level and in a nonconductive state when the SWP current signal is at the second level.

6. The communications device of claim 1, further comprising:
   a switching resistor configured to set the first switch into the conductive state when the switching resistor provides a switching resistor voltage, to the first switch and to set the first switch into a nonconductive state when the switching resistor does not provide the switching resistor voltage to the first switch.

7. The communications device of claim 6, further comprising:
   a comparator configured to compare a reference voltage to the switching resistor voltage to provide a comparator output, the comparator output being at a first voltage when the switching resistor voltage is greater than the reference voltage or at a second voltage when the reference voltage is greater than the switching resistor voltage.

8. The communications device of claim 7, wherein the comparator provides the SWP current signal at the second level to the NFC device when the switching resistor voltage is greater than the reference voltage.

9. The communications device of claim 1, wherein the NFC device is further configured to provide a SWP voltage signal at a first level or at a second level to the UICC.

10. The communications device of claim 9, wherein the SWP current signal is at the first level when the SWP voltage signal is at the second level and the SWP current signal is at the second level when the SWP voltage signal is at the first level.

11. The communications device of claim 1, further comprising:
    a switch controller configured to control when the first switch transitions between the conductive state and a nonconductive state and when the second switch transitions between the nonconductive state and the conductive state.

12. The communications device of claim 11, wherein the switch controller is further configured to set the first switch into the conductive state when the SWP current signal is at the second level and in the nonconductive state when the SWP current signal is at the first level.

13. The communications device of claim 11, wherein the switch controller is further configured to set the second switch into the conductive state when the SWP current signal is at, the first level and in the nonconductive state when the SWP current signal is at the second level.

14. The communications device of claim 11, wherein the switch controller is further configured to refrain from setting, the first switch and the second switch into the conductive state simultaneously and to refrain from setting, the first switch and the second switch into the nonconductive state simultaneously.

15. The communications device of claim 11, wherein the SWP current signal is at the first level when a current value is below a threshold, and wherein the SWP current signal is at the second level when the current value is above the threshold.

16. A method for filtering a single wire protocol (SWP) current signal, comprising:
    providing, by a united integrated circuit card (UICC), the SWP current signal at a first level or at a second level;
    filtering, by a filter, noise from the SWP current signal when the SWP current signal is at the second level;
    receiving, by a near field communications (NFC) device, the SWP current signal that is filtered by the filter;
    providing, by a first switch in a conductive state, the SWP current signal at the second level to the filter; and
    precharging, by a second switch in the conductive state, the filter when the SWP current signal is at the first level.

17. The method of claim 16, wherein the precharging further comprises:
    providing a reference voltage, by a reference voltage module, to the filter when the second switch is in the conductive state and the first switch is in a nonconductive state.

18. The method of claim 17, wherein the precharging further comprises:
    precharging the filter with the reference voltage when the second switch is in the conductive state and the first switch is in the nonconductive state.

19. The method of claim 16, further comprising:
    setting, by a switching resistor, the first switch into the conductive state when the switching resistor provides a switching resistor voltage to the first switch; and
    setting the first switch into a nonconductive state when the switching resistor does not provide the switching resistor voltage to the first switch.

20. The method of claim 16, wherein providing the SWP current signal further comprises:
    comparing, by a comparator, a reference voltage to a switching resistor voltage to provide a comparator output, the comparator output being at a first voltage when the switching resistor voltage is greater than the reference voltage or at a second voltage when the reference voltage is greater than the switching resistor voltage.

\* \* \* \* \*